United States Patent
Ando et al.

(10) Patent No.: US 8,491,291 B2
(45) Date of Patent: Jul. 23, 2013

(54) PATTERN TRANSFER METHOD AND IMPRINT DEVICE

(75) Inventors: Takashi Ando, Hitachi (JP); Susumu Komoriya, Tokorozawa (JP); Masahiko Ogino, Hitachi (JP); Akihiro Miyauchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/366,792

(22) Filed: Feb. 6, 2012

(65) Prior Publication Data

US 2012/0195993 A1 Aug. 2, 2012

Related U.S. Application Data

(62) Division of application No. 11/833,284, filed on Aug. 3, 2007, now Pat. No. 8,133,418.

(30) Foreign Application Priority Data

Aug. 4, 2006 (JP) .................................. 2006-212732

(51) Int. Cl.
 *B29C 59/16* (2006.01)
(52) U.S. Cl.
 USPC .......................... 425/150; 425/171; 425/174.4
(58) Field of Classification Search
 USPC ....................................... 425/150, 171, 174.4
 See application file for complete search history.

(56) References Cited

U.S. PATENT DOCUMENTS

| 6,757,116 | B1 * | 6/2004 | Curtiss et al. | ................... 360/15 |
| 7,815,424 | B2 * | 10/2010 | Nakamura et al. | ............. 425/150 |

FOREIGN PATENT DOCUMENTS

| JP | 2001-264015 | | 9/2001 |
| JP | 2005-116978 | * | 4/2005 |
| JP | 2005-038596 | | 2/2010 |

\* cited by examiner

*Primary Examiner* — Christina Johnson
*Assistant Examiner* — Saeed Huda
(74) *Attorney, Agent, or Firm* — Antonelli, Terry, Stout & Kraus, LLP.

(57) ABSTRACT

In order to allow for aligning a relative position between a transferred object and a stamper with high accuracy without providing an alignment pattern in the transferred object, there are provided: a pattern transfer method, including: when adjusting the relative position between the stamper and the transferred object, a step of detecting at least two or more edge positions of the transferred object and calculating an arbitrary point from the detected edge positions; a step of detecting a position of the stamper from an edge of the stamper or an alignment mark formed in the stamper; and a step of adjusting the relative position between the transferred object and the stamper from the arbitrary point and the position of the stamper; and an imprint device using the same.

6 Claims, 15 Drawing Sheets

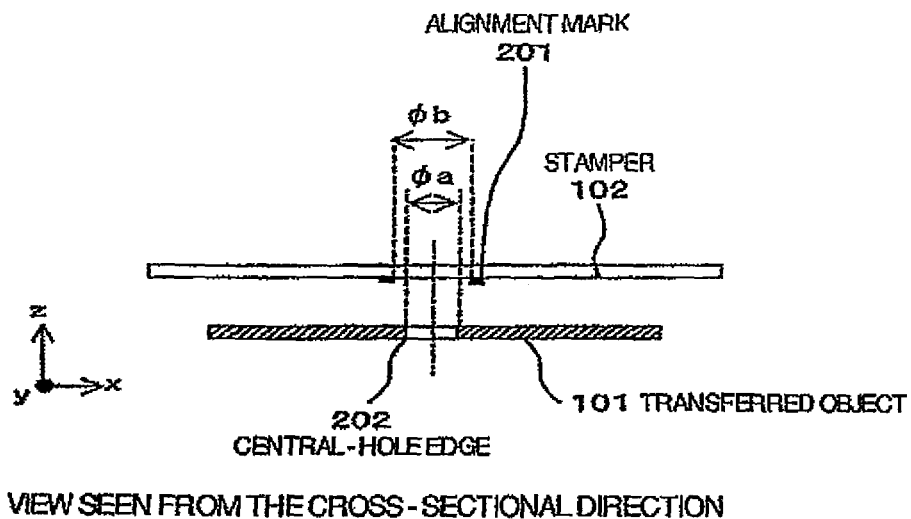
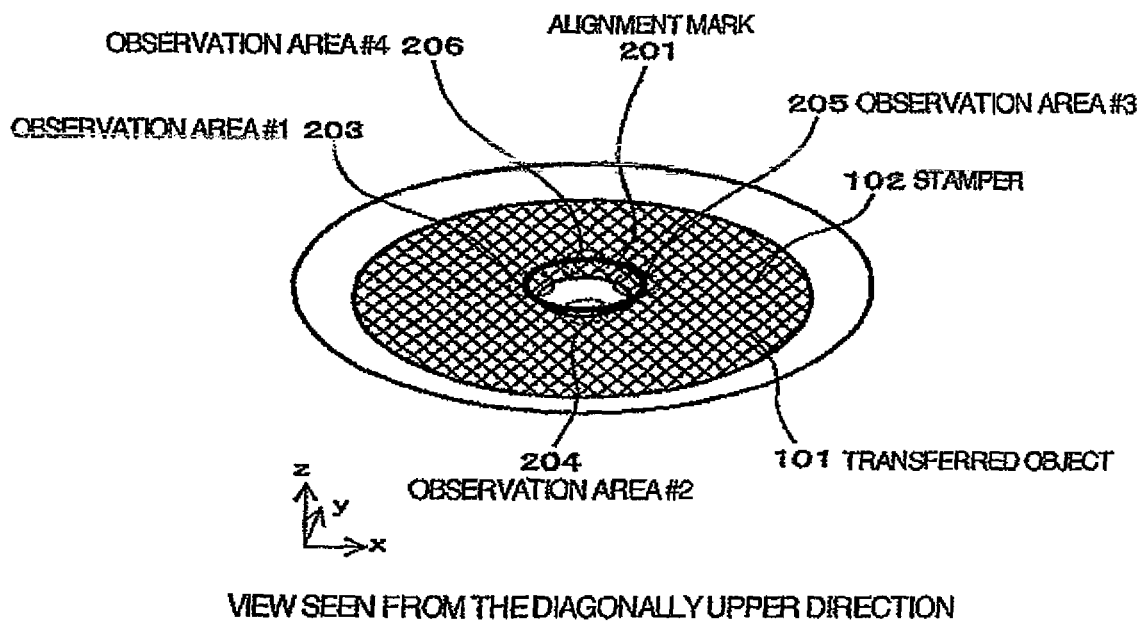

TRANSFERRED OBJECT 101

201 ALIGNMENT MARK    202 CENTRAL-HOLE EDGE

OBSERVATION AREA #1  203

TRANSFERRED OBJECT 101

202 CENTRAL-HOLE EDGE    201 ALIGNMENT MARK

OBSERVATION AREA #2  205

CENTER POSITION OF STAMPER
401

CENTER POSITION OF TRANSFERRED OBJECT
402

PATTERN TRANSFER METHOD AND IMPRINT DEVICE

CROSS REFERENCE TO RELATED APPLICATION

The present application is a divisional of U.S. application Ser. No. 11/833,284 filed Aug. 3, 2007 now U.S. Pat. No. 8,133,418, and claims priority from Japanese Application No. 2006-212732 filed on Aug. 4, 2006, the contents of each of which are hereby incorporated by reference into this application.

BACKGROUND OF THE INVENTION

The present invention relates to a pattern transfer method and imprint device that pressurizes a stamper having concaves and convexes on the surface thereof and a transferred object and thus transfers the concaves and convexes of the stamper onto the surface of the transferred object.

In recent years, the reduction in size and higher integration have been progressing in integrated circuits, and as the pattern transfer technique for realizing the fine processing, higher precision of the photolithography apparatus has been pursued. However, the processing method is approaching the wavelength of a light source of light exposure and the lithography technology is also approaching the limit. For this reason, for the purpose of pursuing further reduction in size and higher precision, an electron beam lithography apparatus, which is a type of a charged particle beam apparatus, is used in place of the lithography technology.

As opposed to the one-shot exposure method in the pattern formation using a light source, such as an i line or an excimer laser, the pattern formation using an electron beam employs a method of drawing mask patterns, and therefore the more patterns to draw, the more exposure (drawing) time it takes and the more pattern formation time it takes, which is a disadvantage. For this reason, as the degree of reduction in pattern size and the degree of integration increase exponentially, the pattern formation time will also increase exponentially accordingly, and thus a significant degradation in throughput is a concern. Then, for the purpose of speeding up the electron beam exposure apparatus, a collective pattern irradiation method has been under development where various shapes of masks are combined and these masks are irradiated with an electron beam to thereby form an electron beam of a complicated shape. As a result, while the reduction in pattern size is progressed, the electron beam lithography apparatus is forced to be enlarged and in addition a mechanism to control the mask position with high accuracy is required, thus causing a disadvantage of increased apparatus cost.

On the other hand, there is an imprint technique for forming fine patterns at low cost. This is a technique, in which a stamper having concaves and convexes of the same pattern as the pattern desired to be formed on a substrate is die-pressed against the surface of a transferred object and then the stamper is detached to thereby transfer a predetermined pattern. Here, with this transferring, fine structure of 25 nm or less can be formed. Then, with regard to the imprint technique, applications to the recording bit formation of a large-capacity recording medium, the pattern formation of semiconductor integrated circuits, and the like are being studied.

In the imprint technique, when forming a fine pattern on the substrate of a large-capacity recording medium or on the substrate of a semiconductor integrated circuit, a relative position between a stamper and a transferred object needs to be aligned with high accuracy in prior to die-pressing the stamper against a resin film layer formed on the surface of the transferred object. For example, JP-A-2005-116978 discloses a technique, in which an alignment mark is provided in the surface of a stamper and the surface of a transferred object, respectively, and then the respective alignment marks of the stamper and transferred object are observed using an optical method, thereby aligning the relative position between the stamper and the transferred object.

However, the alignment mark needs to be provided in both the stamper and transferred object, and thus, it may be difficult to provide the alignment mark in the transferred object, as in a disc substrate used for a magnetic recording medium, for example.

As a method of making alignment of a disc substrate used for a magnetic recording medium without providing an alignment mark in the transferred object, for example, there is known an approach of mechanically making alignment by passing an alignment pin through a central hole of the disc substrate, as in U.S. Pat. No. 6,757,116B1. However, because the alignment accuracy will depend on the processing accuracy between the central hole and the pin, the alignment accuracy obtained in the disc substrate used for a magnetic recording medium is 30 μm at best, and it is thus difficult to make high precision alignment. Moreover, because the pin will mechanically contact with the disc substrate or the stamper, the pin tends to damage the contact portion, resulting in damaging the disc substrate or the stamper.

On the other hand, as the method of aligning a substrate with an exposure stage in an exposure apparatus, there is known an approach to detect the shape of the substrate and the information on the center position from the position information on the substrate edge (JP-A-2001-264015). However, applications to the stamper of imprint technique and to the alignment of the transferred object are not disclosed at all.

SUMMARY OF THE INVENTION

The imprint technique attracts an attention as a technique capable of conveniently transferring such a fine pattern as a nano meter level, but depending on a finished product to be applied, there may be a case where it is difficult to provide an alignment mark in a transferred object or it is not preferable to form an alignment mark. On the other hand, in order to transfer a concavo-convex shape of a stamper to a predetermined pattern formation area of a transferred object, a high precision alignment between the stamper and the transferred object is required. In order to make alignment with high accuracy, an optical approach is desirable, but in the conventional alignment approach an alignment mark needs to be provided in both the transferred object and the stamper. Thus, in the conventional technique, it is difficult to make alignment between the stamper and the transferred object with high accuracy without providing an alignment mark in the transferred object.

It is an object of the present invention to provide a pattern transfer method and imprint device capable of aligning a relative position between a transferred object and a stamper with high accuracy without providing an alignment pattern in the transferred object.

According to an aspect of the present invention, a pattern transfer method includes: a step of adjusting a relative position between a transferred object and a stamper having a concavo-convex pattern in the surface thereof; a step of contacting and pressurizing a concavo-convex pattern plane of the stamper to the transferred object and thus transferring the concavo-convex pattern of the stamper to the transferred object; and a step of detaching the stamper from the transferred object, wherein the step of adjusting a relative position between the transferred object and the stamper includes:

A step of detecting at least two or more edge positions of the transferred object, and calculating an arbitrary point from the detected edge positions; a step of detecting a position of the stamper from an edge of the stamper or an alignment mark formed in the stamper; and a step of adjusting a relative position between the transferred object and the stamper from the arbitrary point and the position of the stamper.

Here, in the present invention, the transferred objects include the one in which a resin layer is formed on a substrate made of quartz, silicon, or the like, or the one, such as a resin substrate or a film, to which patterns can be directly transferred. Moreover, the transferred-object edge is an outer peripheral edge of the transferred object, and from the detected edge a relative position relation between the transferred object and the stamper is calculated. Moreover, if a hole is machined in the center portion of the transferred object, then the central-hole edge is detected and from the detected edge the relative position relation between the transferred object and the stamper may be calculated. Preferably, at least one of the stamper or the transferred object is a transparent body.

According to another aspect of the present invention, an imprint device includes: a light irradiation mechanism for irradiating at least an edge of a transferred object with light, the light irradiation mechanism being installed in the back direction of either one of the transferred object or a stamper; a light detection mechanism for detecting a light that is irradiated from the light irradiation mechanism to an edge of the transferred object, the light detection mechanism being installed in the back direction of the other one of the transferred object or the stamper; a position detector that detects an edge position of the transferred object from a detection result of the photodetector and calculates an arbitrary point from the edge position; and a positioning mechanism that adjusts a relative position between the transferred object and the stamper from the position information detected by the position detector.

The present invention can provide a pattern transfer method and imprint device capable of aligning a relative position between a stamper and a transferred object with high accuracy even without providing an alignment pattern in the transferred object.

Other objects, features and advantages of the invention will become apparent from the following description of the embodiments of the invention taken in conjunction with the accompanying drawings.

BRIEF DESCRIPTION OF THE DRAWINGS

FIGS. 2A and 2B are flow charts explaining an arrangement of a transferred object and a stamper of the present invention.

DETAILED DESCRIPTION OF THE INVENTION

Hereinafter, preferred embodiments for carrying out the present invention will be described.

Figure 1:
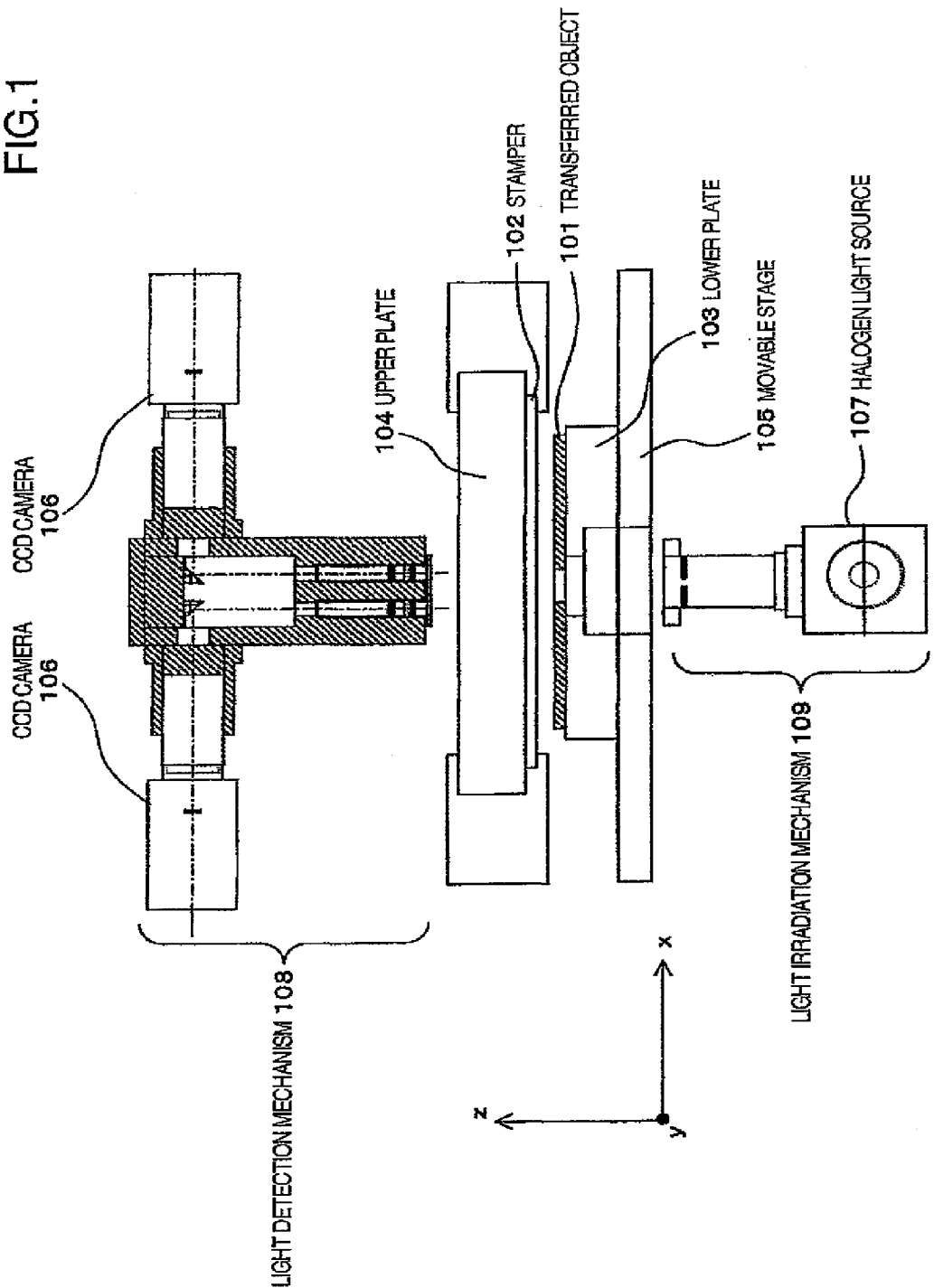
FIG. 1 is a view explaining an imprint device of the present invention.

FIG. 1 schematically shows the configuration of only an alignment mechanism section of an imprint device for implementing an alignment method of the present invention. A glass substrate to serve as a transferred object 101 is vacuum absorbed and fixed to a lower plate 103 that is attached on a movable stage 105. A resin material with added photosensitive material is applied to the surface of the transferred object 101. Moreover, a hole is formed in the center of the transferred object 101. A quartz stamper 102 having a concavo-convex shape formed on the surface thereof, and an upper plate 104 made of glass for holding the stamper are disposed above the transferred object 101. Moreover, a light irradiation mechanism 109 is installed on the back of the lower plate 103. Moreover, a light detection mechanism 108 provided with a CCD camera 106 is installed on the back of the upper plate 104.

The stamper 102 used in the present invention has a fine concavo-convex pattern to be transferred, and the method of forming the concavo-convex pattern is not limited in particular. For example, photolithography, focused ion beam lithography or electron beam lithography, plating method, or the like is selected corresponding to a desired machining accuracy. As the material of the stamper, silicon, glass, nickel, resin, and the like may be used, and any material having a certain hardness and a required workability may be used.

As the transferred object 101 used in the present invention, the ones, such as a resin film applied onto a substrate, a resin substrate, a resin sheet, and the like, having a desired fine machining accuracy of the substrate surface are preferable. The suitable resin materials also include synthetic materials, of which main ingredient is cycloolefin polymer, polymethylmethacrylate, polystyrene, polycarbonate, polyethylene terephthalate (PET), polylactic acid, polypropylene, polyethylene, polyvinyl alcohol, or the like, and to which ingredients a photosensitive material is added. Moreover, as the substrate at the time of applying a resin film, various materials, such as silicon, glass, aluminum alloy, and resin can be processed for use.

In the present invention, a light detection mechanism for recognizing a transferred object is installed in the back direction of either the transferred object or the stamper, while in the back direction of the transferred object or the stamper, in which direction the light detection mechanism is not installed, a light irradiation mechanism is disposed and the transmission intensity of light irradiated from the light irradiation mechanism is detected by this light detection mechanism. Preferably, there are installed at least two light detection mechanisms, which detect the transferred-object edge at a different place, respectively. Moreover, the depth of focus of the light detection mechanism may be set to the same as the thickness of the transferred object or greater than that in order to increase the detection accuracy of the edge of the transferred object.

The stamper 102 and transferred object 101 are held to the independent upper plate 104 and lower plate 103, respectively, so as to keep their parallel state, and one of the plates is attached to a stage that operates in the parallel plane, whereby the stamper 102 and transferred object 101 are aligned so as to have a desired relative position relation.

A method of arranging the transferred object 101 and stamper 102 is specifically described using FIGS. 2A and 2B. In the stamper 102, a ring-shaped metal thin film with a diameter φb different from a diameter φa of a central hole of the transferred object 101 is formed as an alignment mark 201.

Moreover, the inclinations of the stamper 102 and transferred object 101 are adjusted in advance so that the contact surfaces of the stamper and transferred object may become parallel to each other. At this time, it is helpful to keep a space of 10 μm to 100 μm between the stamper 102 and transferred object 101 so that the stamper 102 and transferred object 101 will not rub to each other.

As shown in FIG. 1, the light irradiation mechanism 109 is installed on the back of the lower plate 103. Moreover, the light detection mechanism 108 provided with the CCD camera 106 is installed on the back of the upper plate 104. In addition, FIG. 1 shows the x-z plane in which two CCD cameras 106 are installed on the x axis, but also concerning the y-z plane, two CCD cameras are installed on the y axis. With the use of a total of four these CCD cameras, two-dimensional images of a central-hole edge 202 of the transferred object in observation areas 203, 204, 205, and 206 shown in FIG. 2B and of the alignment mark 201 of the stamper 102 are taken simultaneously. In the two-dimensional images, a difference in intensity of transmitted light between at the central-hole edge 202 of the glass substrate and at the alignment mark 201 of the stamper 102 will be detected as describe later.

Figure 3:
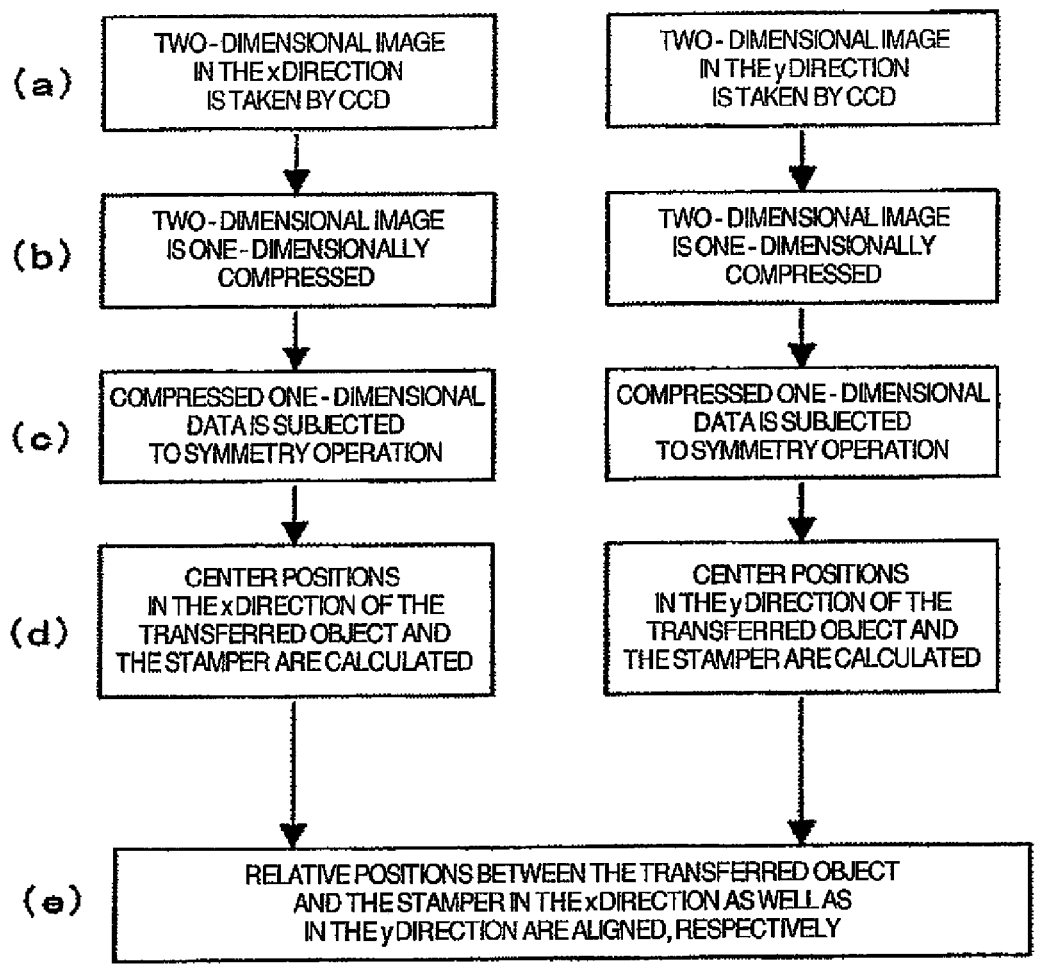
FIG. 3 is a view explaining the steps of aligning a relative position between the transferred object and the stamper of the present invention.

The center positions of the transferred object 101 and stamper 102 are calculated using the two-dimensional images taken by the CCD camera 106. FIG. 3 shows the steps of calculating the center positions of the transferred object 101 and stamper 102 and aligning the relative position between the stamper 102 and the transferred object 101. (a) After taking two-dimensional images, (b) the two-dimensional images are subjected to one-dimensional compression. Then, (c) the one-dimensionally compressed data is subjected to a symmetry operation, and thereby (d) the center position of the transferred object 101 and the center position of the stamper 102 are calculated, respectively. Then, (e) the movable stage 105 is moved so that the center position of the transferred object 101 and the center position of the stamper 102 coincide with each other, thereby aligning the relative position between the stamper 102 and the transferred object 101.

After aligning the relative position between the stamper 102 and the transferred object 101, the movable stage 105 is raised to press the stamper 102 against the transferred object 101. After pressing the stamper 102, the resin is irradiated with UV light for curing. By detaching the stamper after the resin is cured, the concavo-convex shape on the surface of the stamper is transferred to the surface of the resin.

Although in this description a substrate whose central hole is machined is taken as the transferred object 101 and the alignment is made using the central-hole edge, a similar alignment can be made even using the outer peripheral edge of the substrate. In this case, in the stamper 102, a ring-shaped alignment mark with a diameter different from the outer peripheral edge of the transferred object 101 may be installed in a position where it can be observed in conjunction with the outer peripheral edge of the transferred object 101.

Although in this description a substrate whose central hole is machined is taken as the transferred object 101, a substrate whose central hole is not machined may be used. In this case, the alignment may be made using the outer peripheral edge of the substrate.

Although in this description the ring-shaped alignment mark 201 is formed in the stamper 102, the alignment mark 201 of the stamper 102 is not limited to the ring-shaped one. For example, shapes, such as a straight line, circle, polygon, cross mark, and the like which the light detection mechanism 108 can detect may be employed.

Although in this description the alignment mark 201 of the stamper 102 is formed of a metal thin film, the alignment mark is not limited to a metal thin film one as long as the transmissivity of detection light changes. For example, a dielectric thin film may be formed or the surface of the stamper may be formed into a recessed shape.

Although in this description the alignment mark 201 is formed in the stamper 102, an edge of the stamper may be detected as in the transferred object 101, thereby calculating the center position of the stamper 102 and aligning the relative position between the center of the transferred object 101 and the stamper 102.

In this description, as an arbitrary point for calculating the position of the transferred object 101, the center position of the transferred object is calculated from the central-hole edge of the transferred object, and as an arbitrary point for calculating the position of the stamper 102, the center position is calculated from the alignment mark of the stamper, and then the center positions of the transferred object and stamper are matched with each other, thereby aligning the relative position. However, the center positions need not be matched with each other. For example, the imprint may be carried out while the center position of the transferred object is aligned with a position that is shifted in the x axis direction by +1 mm and shifted in the y axis direction by +1 mm relative to the center position of the stamper.

Although in the present invention the transferred-object edge and the alignment mark of the stamper are recognized with the same CCD camera, the transferred-object edge and the alignment mark of the stamper may be recognized with different CCD cameras, respectively. For example, a CCD camera for imaging the substrate edge of the transferred object to be recognized and a CCD camera for imaging the alignment mark of the stamper may be installed separately. In this case, it is helpful if a relative position relation between the CCD camera for imaging a transferred object and the CCD camera for imaging an alignment mark of a stamper is measured in advance.

Although in this description the CCD camera 106 is mounted on the light detection mechanism 108, the light detection mechanism 108 may be modified depending on the output light from the light irradiation mechanism 109. For example, in the case where a semiconductor laser that outputs infrared light is incorporated into the light irradiation mechanism, it is helpful that an infrared detection sensor is installed in the light detection mechanism.

Although in this description four transferred-object edges are detected to calculate the center of the transferred object, the number of edges for measurement may be two or more.

Although in this description a resin film layer with added photosensitive material is taken as the transferred object 101, a thermoplastic resin may be employed. In this case, before pressing the stamper 102 against the transferred object 101, the transferred object 101 is heated to above a glass transition temperature of the thermoplastic resin. Then, after pressing the stamper 102, the transferred object 101 and stamper 102 are cooled to cure the resin. By detaching the stamper 102 after the resin is cured, the concavo-convex shape on the surface of the stamper is transferred to the surface of the resin.

Although in this description the transparent quality of the materials are used for the transferred object 101 and stamper 102, at least either one just need to be transparent. For example, in the case where the transferred object 101 is opaque, the transparent stamper 102 is prepared. Then, by installing the ring-shaped alignment mark 201 with a diameter $\phi b$ smaller than a diameter $\phi a$ of the central hole of the transferred object, it is possible to detect the central-hole edge 202 of the transferred object 101 and the alignment mark 201 of the stamper 102 stamper 102 simultaneously.

The method of detecting the center positions of the transferred object 101 and stamper 102 of the present invention can be applied also at the time of evaluating a relative position offset between the transferred object 101 and the stamper 102 immediately after pressing the stamper 102 against the transferred object as well as after curing the resin.

Hereinafter, an embodiment will be described, in which a pattern is formed using the pattern transfer method and imprint device of the present invention.

Embodiment 1

Groove Structure Formation

As the transferred object 101, a glass substrate with 65 mm in diameter, 0.6 mm in thickness, and the central hole diameter $\phi a=20$ mm is used. The outer peripheral edge and inner circle edge of the transferred object 101 are chamfered at 0.15 mm in width. Moreover, a resin layer with added photosensitive material is formed on the surface of the transferred object 101 in advance. Here, as the method of forming the resin layer, a method of forming a resin layer using a spin coat method and a method of applying a droplet, such as a dispense method, can be applied. In addition, in the case where a droplet is applied, in a subsequent step of pressing the stamper and the transferred object against each other, the droplet will be pressed and spread to form a desired pattern. It is preferable that the droplet be applied to a plurality of places and that the position and application quantity thereof be determined considering the spreading of the resin from the physical properties, such as viscosity, of the resin.

As the stamper 102, a quartz substrate with 100 mm in diameter and 0.5 mm in thickness is used. Then, the ring-shaped alignment mark 201 is formed in diameter $\phi b=20.7$ mm and width of 0.02 mm by depositing a metal thin film. Moreover, in the plane in contact with the transferred object 101, grooves with 50 nm in width, 100 nm in depth, and a pitch of 100 nm are formed concentrically using a well-known electron beam (EB) direct drawing method. At this time, the pattern is drawn using an EB method so that the center axis of the concentric circular grooves may coincide with the center axis of the alignment mark 201.

A method of installing the transferred object 101 and stamper 102 is described using FIGS. 1, 2A and 2B. The transferred object 101 is vacuum adsorbed to the lower plate 103 that is attached onto the movable stage 105, while the stamper 102 is held to the glass upper plate 104. A part of the lower plate 103 is formed of glass so as to transmit light from the light irradiation mechanism 109 described later. The inclinations of the stamper 102 and transferred object 101 are adjusted in advance so that the contact surfaces between the stamper and the transferred object may be parallel to each other. At this time, a gap between the stamper 102 and the transferred object 101 is set to approximately 50 µm. Moreover, a stage that operates at 0.1 µm step in the x axis direction and y axis direction, respectively, is installed as the movable stage 105.

On the back of the lower plate 103 the light irradiation mechanism 109 is disposed, and on the back of the upper plate 104 the light detection mechanism 108 provided with the CCD camera 106 is disposed so as to observe four places of the central-hole edge 202 of the transferred object 101. Moreover, the stamper 102 is disposed in such a manner that the central-hole edge 202 of the transferred object 101 and the alignment mark 201 of the stamper 102 may be observed simultaneously. Here, an ordinary halogen light source 107 is used as the light source of the light irradiation mechanism 109, and an optical filter that blocks light with a wavelength of 500 nm or less is inserted in the optical system. Moreover, an optical system with the projecting magnification of four and the depth of focus of 1 mm is incorporated into the light detection mechanism 108. Moreover, as the CCD camera 106, a commercially available one with the effective pixels of 768×494 and the imaging area of 3.6 mm×2.7 mm is used. In this case, one CCD pixel with 1.46 µm in width is used. Two-dimensional images taken by the CCD camera 106 are captured into a non-illustrated processor unit.

Figure 4A:
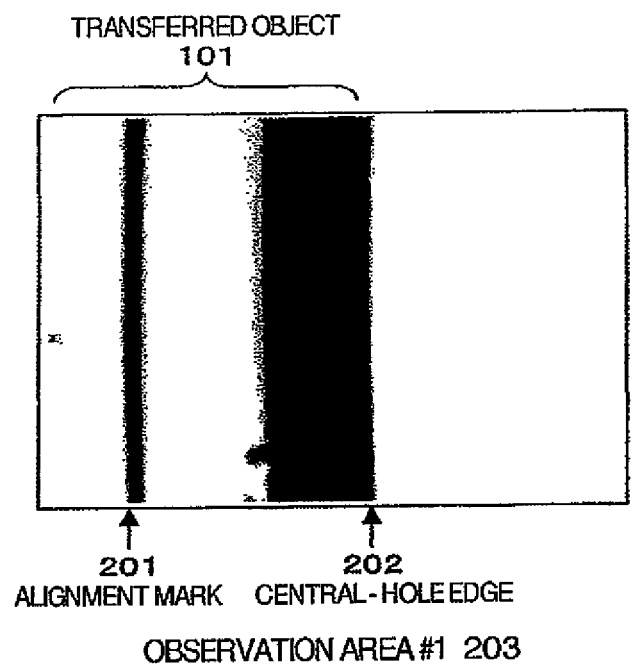
FIGS. 4A and 4B are views showing two-dimensional images obtained in an alignment mechanism of the present invention.
Figure 4B:
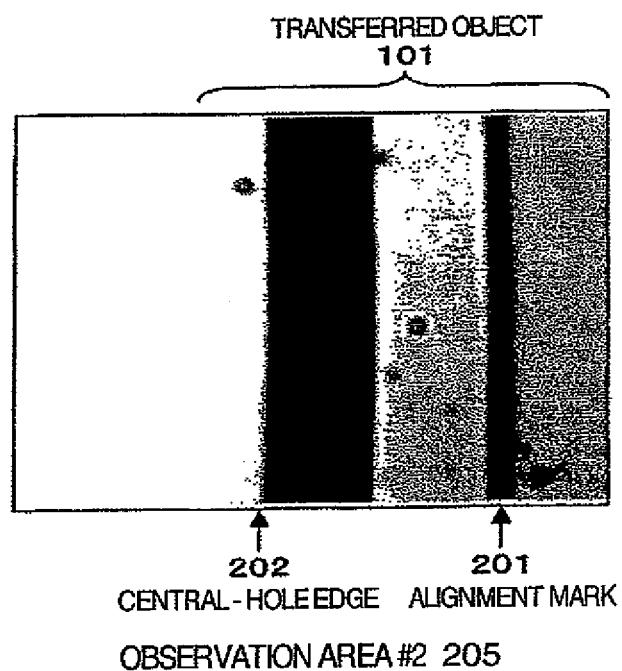
Figure 5:
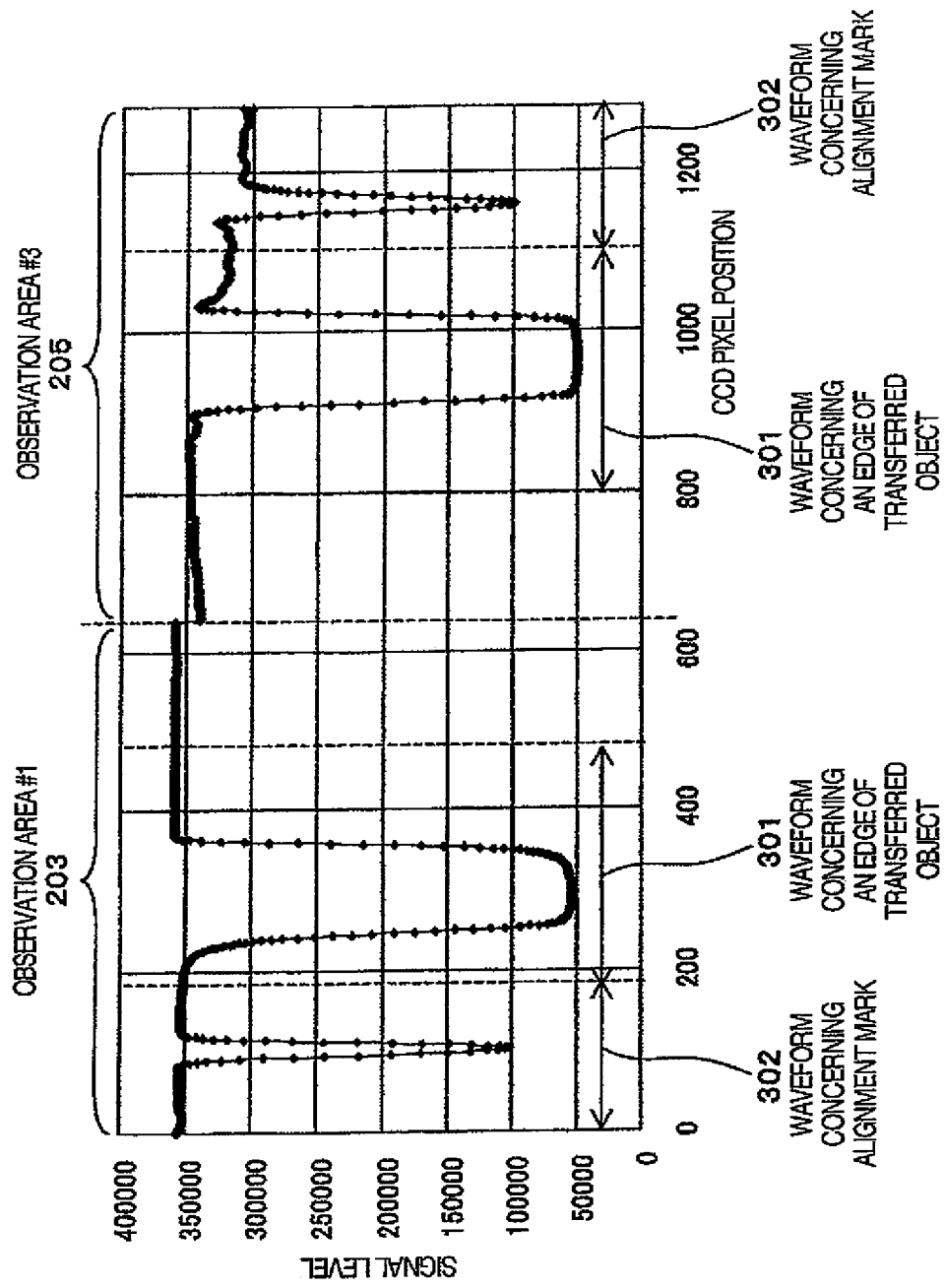
FIG. 5 is a view showing a distribution of signal levels after one-dimensional compression processing, obtained in the alignment mechanism of the present invention.
Figure 6:
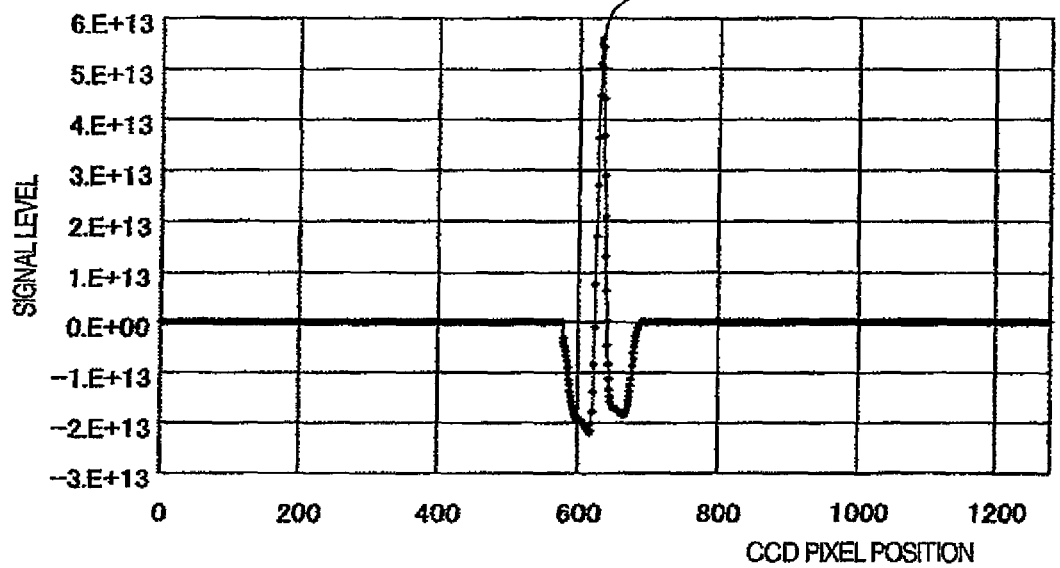
FIG. 6 is a view showing a signal level after symmetry operation of a transferred-object edge obtained in the alignment mechanism of the present invention.
Figure 7:
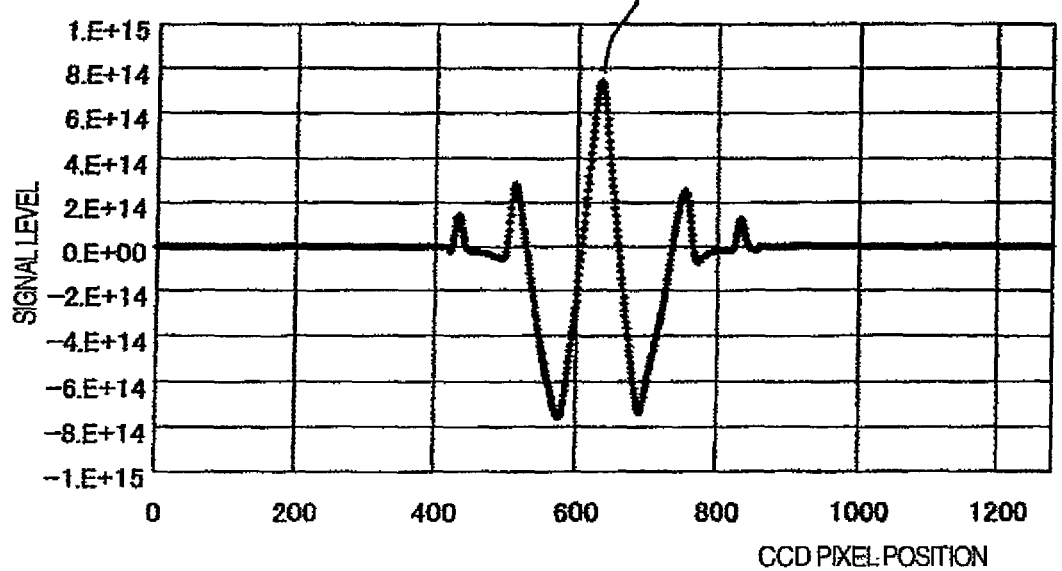
FIG. 7 is a view showing a signal level after the symmetry operation of an alignment mark formed in a stamper, obtained in the alignment mechanism of the present invention.

After capturing the two-dimensional images into the processor unit, in the steps shown in FIG. 3 the center positions of the transferred object 101 and stamper 102 are calculated and the relative position between the stamper 102 and the transferred object 101 is aligned. As an example, a method of aligning the relative position in the x axis direction is described using the images taken in the observation area 203 and observation area 205. One-dimensional compression processing of the two-dimensional images (FIGS. 4A and 4B) that were taken by the CCD camera 106 provides a distribution of signal levels shown in FIG. 5. Moreover, a signal waveform shown in FIG. 6 is obtained by carrying out a symmetry operation of a waveform 301 concerning the central-hole edge 202 of the transferred object, and a signal waveform shown in FIG. 7 is obtained by carrying out a symmetry operation of a waveform 302 concerning the alignment mark 201, respectively. From the signal levels after the symmetry operation, the position of the center coordinate in the x axis direction of the transferred object is calculated as 922.1 µm, and the position of the center coordinate in the x axis direction of the stamper 102 is calculated as 912.0 µm, and thus the relative position offset between the transferred object 101 and the stamper 102 is 10.1 μm. Finally, by moving the movable stage 105 in the direction for compensating the relative position offset between the stamper 102 and the transferred object 101 in the x axis direction, the relative position between the stamper 102 and the transferred object 101 in the x axis direction is aligned.

Moreover, with the use of the images taken in the observation area 204 and observation area 206, the relative position between the stamper 102 and the transferred object 101 in the y axis direction is aligned, as in the method of aligning the relative position between the stamper 102 and the transferred object 101 in the x axis direction described above.

Figure 8:
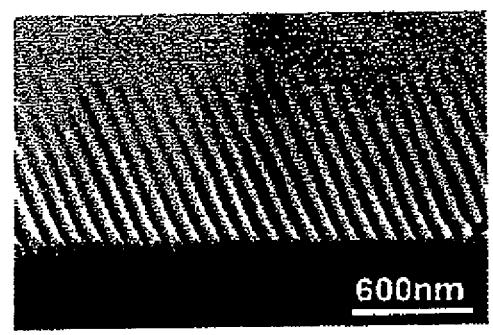
FIG. 8 is a groove structure pattern formed by means of a nanoimprint device of the present invention.

After aligning the relative position between the stamper 102 and the transferred object 101, the movable stage 105 is raised in the z axis direction to press the stamper 102 against the transferred object 101. After the resin is irradiated with UV light for curing while pressing the stamper 102, the stamper 102 is detached, and thereby it was confirmed that a structure with 50 nm in width, 100 nm in depth, and a pitch of 100 nm formed in the stamper 102 is transferred. FIG. 8 shows an electron microscope photograph of the transferred structure.

Note that although the relative position between the transferred object 101 and the stamper 102 was evaluated using the light detection mechanism 108 after pressing the stamper 102 against the transferred object 101, no deviation from the relative position before pressing the stamper 102 was observed. In other words, the alignment position is maintained even if the stamper 102 is pressed.

In addition, when the relative position relation between the stamper 102 and transferred object 101 was measured repeatedly 20 times in order to evaluate the detection repeatability of the relative position between the stamper 102 and transferred object 101, the detection of the relative position with $3\sigma=10$ nm was confirmed.

Although in this embodiment a substrate whose central hole is machined is taken as the transferred object 101 and the alignment is made using the central-hole edge 202, a similar alignment can be made even using the outer peripheral edge (65 mm φ in diameter) of the substrate. In this case, in the stamper 102, the ring-shaped alignment mark 201 may be formed with a diameter of 65.7 mm and width of 0.02 mm by depositing a metal thin film.

Although in this embodiment the ring-shaped alignment mark 201 is formed in the stamper 102, the alignment mark 201 of the stamper 102 is not limited to the ring-shaped one. For example, a line of tangency in contact with the circumference with a diameter φb=20.7 mm may be formed.

In this description the alignment mark 201 of the stamper 102 is formed of a metal thin film, but not limited to a metal thin film one if the transmissivity of detection light changes. For example, a groove with a diameter φb=20.7 mm, 0.02 mm in width, and 0.5 μm in depth may be formed in the surface of the stamper 102. In this case, the bottom of the groove may be moderately rough.

Although in this description the alignment mark 201 is formed in the stamper 102, the edge of the stamper 102 may be detected to calculate the center position of the stamper 102, as in the transferred object 101, thereby aligning the relative position between the transferred object 101 and the stamper 102. For example, as the stamper 102, a quartz substrate with 65 mm in diameter, 0.6 mm in thickness, and a central hole diameter φb=19.55 mm may be used. In this case, the depth of focus of the optical system incorporated in the light detection mechanism 108 is set to greater than a combined thickness of the thickness of the transferred object 101 and thickness of the stamper 102. For example, the depth of focus may be set to 1.3 mm.

Although in this description the transparent quality of the materials are used for the transferred object 101 and stamper 102, at least either one just needs to be transparent. For example, in the case where a metal substrate with 65 mm in diameter, 0.6 mm in thickness, and the central hole diameter φa=20 mm is used as the transferred object 101, the stamper 102 made of quartz will be used. By forming the ring-shaped alignment mark 201 with a diameter φb=19.58 mm and a width of 0.02 mm in the stamper 102 by depositing a metal thin film, it is possible to detect the central-hole edge 202 of the transferred object and the alignment mark 201 of the stamper 102.

Embodiment 2

Columnar Structure Formation

Figure 9:
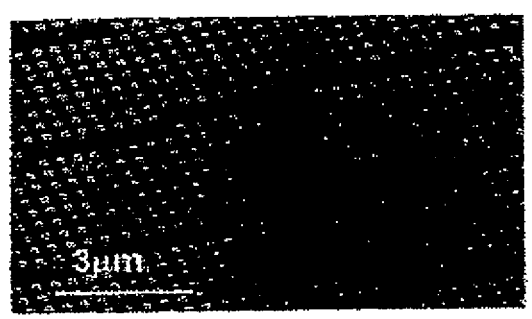
FIG. 9 is a columnar structure pattern formed by means of the nanoimprint device of the present invention.

A transferred object, in which a fine concavo-convex shape is formed using the same method as Embodiment 1, is prepared. A stamper was used, in which a pit with 0.18 μm in diameter, 1 μm in depth, and a pitch of 360 nm is formed in the whole surface of a quartz substrate with 100 mm in diameter and 1 mm in thickness using a well-known photolithography method. Moreover, a ring-shaped alignment mark with 65.7 mm in diameter and 0.02 mm in width is formed in the stamper. A transferred object is used, in which a resin layer with added photosensitivity material and with 500 nm in thickness is formed on the surface of a glass substrate with 100 mm in diameter and 0.5 mm in thickness. With the use of the above-described stamper and transferred object, a transferred object is obtained, in which a columnar structure with 0.18 μm in diameter, 1 μm in height, and a pitch of 360 nm is formed on the surface of the transferred object. FIG. 9 shows a SEM photograph of the concavo-convex shape formed in this embodiment.

Embodiment 3-1

Recording Medium

A transferred object, on which a fine concavo-convex shape is formed by the same method as Embodiment 1, is prepared, and a substrate used for a large-capacity magnetic medium (discrete track medium) is prepared. With the resin film layer, in which a fine structure on the glass substrate prepared in Embodiment 1 is formed, being as a mask, the same structure as the fine structure formed in the surface of the resin film layer is formed in the surface of a glass substrate using the well-known dry etching method. On the glass substrate, in which the fine structure is formed, a discrete track medium corresponding to a surface recording density of 200 Gbpsi is prepared by sequentially depositing a Cr underlayer of 15 nm, a CoCrPt magnetic layer of 14 nm, and a C protective layer of 10 nm using a sputtering technique that is commonly used in forming a magnetic recording medium.

In the magnetic recording medium, a center portion of a disc substrate to serve as the transferred object is hole-drilled, and a concavo-convex shape is formed concentrically from the center of the disc substrate. Usually, in the disc substrate, read/write of magnetic recording information corresponding to a concavo-convex shape is carried out while the disc substrate is fixed to a central hole and is rotated. For this reason, it is important that the center position of the concentric circular concavo-convex pattern formed in the disc substrate is aligned with the center of rotation (corresponding to the center position of the central hole) of the disc substrate. The hole processing accuracy (deviation between the center of the outer circle of the disc substrate and the center of the central hole) of the disc substrate is approximately in the range of 3 to 10 µm. Accordingly, when patterning a substrate used for a magnetic recording medium, it is preferable in terms of making high precision alignment that the center position be calculated from the edge position of the central hole of the disc substrate, thereby making alignment with the stamper.

Embodiment 3-2

Recording Medium

In this embodiment, a method of manufacturing a discrete track medium using the pattern transfer method of the present invention is described referring to the drawings, appropriately. Referring to the drawings, FIGS. 10A-10D are explanatory views of the manufacturing process of the discrete track medium.

Figure 10A:
FIGS. 10A-10D are explanatory views of the manufacturing process of a discrete track medium.

First, as shown in FIG. 10A, the one obtained in Embodiment 1 is prepared, the one having a pattern formation layer 21 on a glass substrate 22, the pattern formation layer 21 being composed of a photo-setting resin 6, to the pattern formation layer 21 a surface shape of the stamper 2 being transferred.

Figure 10B:

Next, with the pattern formation layer 21 being as a mask, the surface of the glass substrate 22 is processed using the well-known dry etching method. As a result, as shown in FIG. 10B, on the surface of the glass substrate 22, concaves and convexes corresponding to the pattern of the pattern formation layer 21 are etched out. In addition, in this dry etching, a fluorine containing gas is used. Moreover, the dry etching may be carried out in such a manner that after removing a thin layer portion of the pattern formation layer 21 by oxygen plasma etching, the exposed glass substrate 22 is etched using a fluorine containing gas.

Figure 10C:
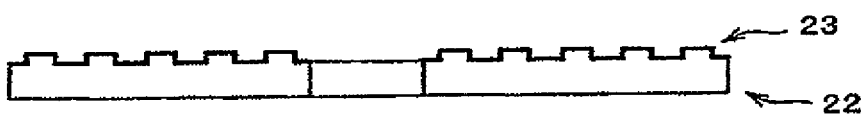

Next, as shown in FIG. 10C, in the glass substrate 22 in which the concaves and convexes are formed, a magnetic recording medium formation layer 23 comprised of a pre-coat layer, a magnetic domain control layer, a soft magnetic underlayer, an intermediate layer, a vertical recording layer, and a protective layer is formed using a DC magnetron sputtering method (for example, see JP-A-2005-038596). In addition, the magnetic domain control layer here is formed of a non-magnetic layer and an antiferromagnetic layer.

Figure 10D:
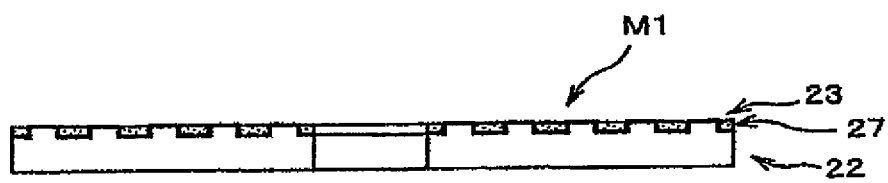

Next, as shown in FIG. 10D, the surface of the glass substrate 22 is planarized by applying a nonmagnetic substance 27 onto the magnetic recording medium formation layer 23. As a result, a discrete track medium M1 corresponding to a surface recording density of 200 Gbpsi is obtained.

Embodiment 3-3

Recording Medium

In this embodiment, a method of manufacturing a discrete track medium using the pattern transfer method of the present invention is described referring to the drawings, appropriately. Referring to the drawings, FIGS. 11A-11E are explanatory views of the manufacturing process of the discrete track medium.

Figure 11A:
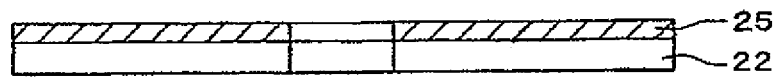
FIGS. 11A-11E are explanatory views of the manufacturing process of a discrete track medium.
Figure 11B:
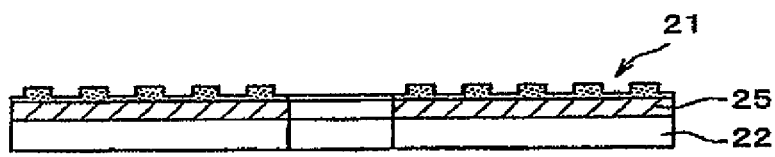

In this embodiment, in place of the glass substrate 22 having the pattern formation layer 21 obtained in Embodiment 1, the following substrate is prepared. As shown in FIG. 11B, this substrate is the one obtained by forming a soft magnetic underlayer 25 on the glass substrate 22. Then, as in Embodiment 1, the pattern formation layer 21 composed of the photo-setting resin 6, to the pattern formation layer 21 a surface shape of the stamper 102 being transferred, is formed on this substrate.

Figure 11C:

Next, with the pattern formation layer 21 being as a mask, the surface of the soft magnetic underlayer 25 is processed using the well-known dry etching method. As a result, as shown in FIG. 11C, on the surface of the soft magnetic underlayer 25, concaves and convexes corresponding to the pattern of the pattern formation layer 21 are etched out. In addition, in this dry etching, a fluorine containing gas is used.

Figure 11D:

Next, as shown in FIG. 11D, on the soft magnetic underlayer 25, in which the concaves and convexes are formed, a magnetic recording medium formation layer 23 comprised of a pre-coat layer, a magnetic domain control layer, a soft magnetic underlayer, an intermediate layer, a vertical recording layer, and a protective layers is formed using a DC magnetron sputtering method (for example, see JP-A-2005-038596). In addition, the magnetic domain control layer here is formed of a non-magnetic layer and an antiferromagnetic layer.

Figure 11E:
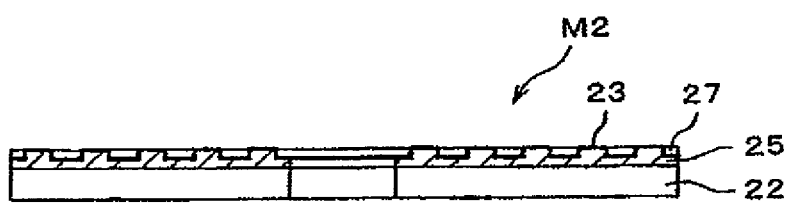

Next, as shown in FIG. 11E, the surface of the soft magnetic underlayer 25 is planarized by applying the nonmagnetic substance 27 onto the magnetic recording medium formation layer 23. As a result, a discrete track medium M2 corresponding to a surface recording density of 200 Gbpsi is obtained.

Embodiment 3-4

Recording Medium

In this embodiment, a method of manufacturing a disc substrate used for a discrete track medium using the pattern transfer method of the present invention is described referring to the drawings, appropriately. Referring to the drawings, FIGS. 12A-12E are explanatory views of the manufacturing process of the disc substrate for a discrete track medium.

Figure 12A:
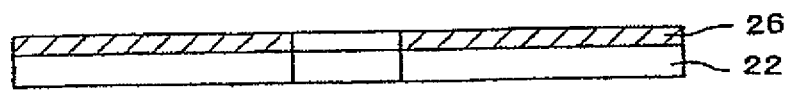
FIGS. 12A-12E are explanatory views of the manufacturing process of a disc substrate used for a discrete track medium.
Figure 12B:

As shown in FIG. 12A, a novolak-based resin material is applied to the surface of the glass substrate 22 in advance to form a flat layer 26. This flat layer 26 include a spin coat method and a method of pressing the resin with a flat plate. Next, as shown in FIG. 12B, the pattern formation layer 21 is formed on the flat layer 26. This pattern formation layer 21 is formed by applying a silicon-containing resin material onto the flat layer 26 and then using the pattern transfer method of the present invention.

Figure 12C:
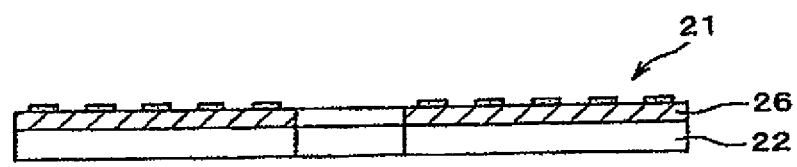
Figure 12D:
Figure 12E:

Then, as shown in FIG. 12C, a thin layer portion of the pattern formation layer 21 is removed by dry etching using a fluorine containing gas. Next, as shown in FIG. 12D, the flat layer 26 is removed by oxygen plasma etching with the remaining pattern formation layer 21 portion being as a mask. Then, the surface of the glass substrate 22 is etched using a fluorine containing gas to remove the remaining pattern formation layer 21, thereby obtaining a disc substrate M3 used for a discrete track medium corresponding to a surface recording density of 200 Gbpsi, as shown in FIG. 12E.

Embodiment 3-5

Recording Medium

In this embodiment, a method of manufacturing a disc substrate used for a discrete track medium using the pattern transfer method of the present invention is described referring to the drawings, appropriately. Referring to the drawings, FIGS. 13A-13E are explanatory views of the manufacturing process of the disc substrate for the discrete track medium.

Figure 13A:
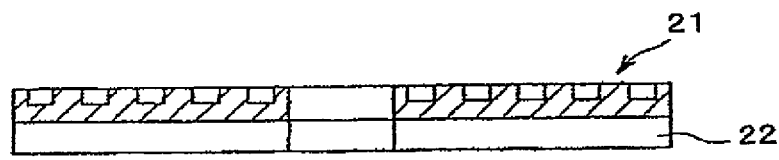
FIGS. 13A-13E are explanatory views of the manufacturing process of a disc substrate used for a discrete track medium.
Figure 13B:
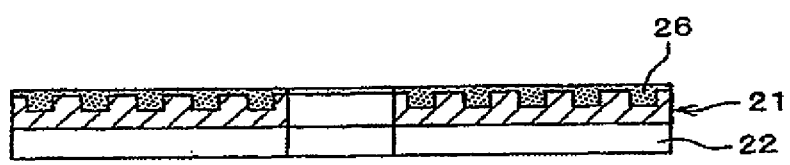
Figure 13C:
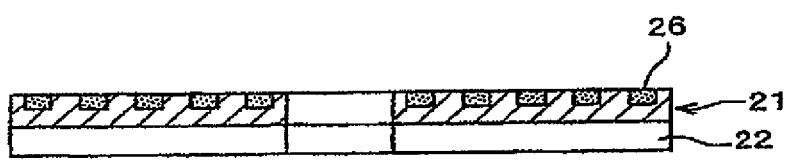
Figure 13D:
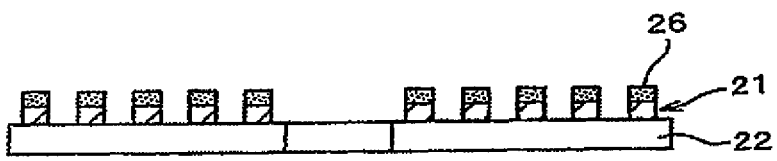
Figure 13E:

As shown in FIG. 13A, an acrylate resin with added photosensitive material is applied to the surface of the glass substrate 22, and also the pattern formation layer 21 is formed on the glass substrate 22 using the pattern transfer method of the present invention. In this embodiment, a pattern having reversed concaves and convexes of the concaves and convexes of a pattern intended to be formed is formed on the glass substrate 22. Next, as shown in FIG. 13B, a resin material containing silicon and photosensitive material is applied to the surface of the pattern formation layer 21 to form the flat layer 26. The methods of forming this flat layer 26 include a spin coat method and a method of pressing the resin with a flat plate. Then, as shown in FIG. 13C, when the surface of the flat layer 26 is etched by a fluorine containing gas, the uppermost surface of the pattern formation layer 21 is exposed. Next, as shown in FIG. 13D, with the remaining flat layer 26 being as a mask, the pattern formation layer 21 is removed by oxygen plasma etching and the surface of the glass substrate 22 is exposed. Then, as shown in FIG. 13E, the surface of the exposed glass substrate 22 is etched by a fluorine containing gas, thereby obtaining a disc substrate M4 used for a discrete track medium corresponding to a surface recording density of 200 Gbpsi.

Embodiment 4

Optical Device

Figure 14:
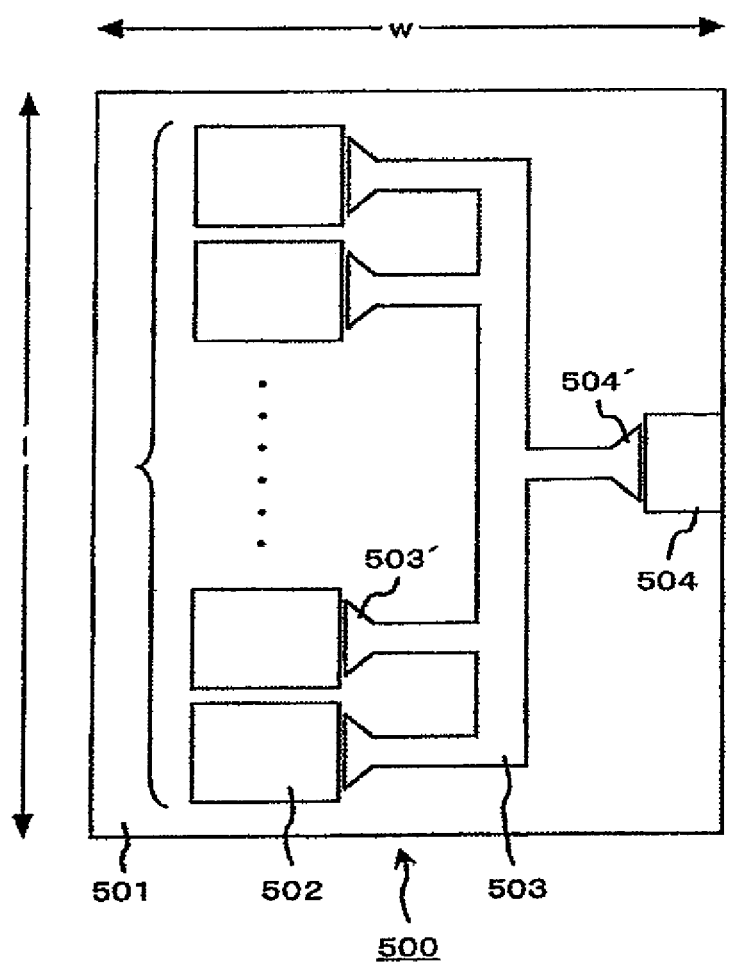
FIG. 14 is a schematic plan view showing a configuration of an optical circuit according to an embodiment of the present invention.

In this embodiment, an example is described, in which an optical device 200 for changing the traveling direction of an incident light is applied to an optical information processing device. FIG. 14 is a schematic configuration view of an optical circuit 500 prepared according to the present invention. The optical circuit 500 is formed on a substrate 501 made of aluminium nitride with 30 mm in length (l), 5 mm in width (W), and 1 mm in thickness. The optical circuit 500 comprises: ten transmission units 502 each comprised of an indium phosphorus-based semiconductor laser and a driver circuit; optical waveguides 503, 503', and optical connectors 504, 504'.

Note that the respective lasing wavelengths of ten semiconductor lasers are set so as to differ from each other by 2-50 nm. The optical circuit 500 is a base component of a device of an optical multiplex communication system. The present invention is applied to the portion of the waveguides 503, 503'. This waveguide 503 receives a light signal inputted from the transmission unit 502 by means of a connecting portion 503', and sends this, sequentially through a sub-waveguide 506 and a main waveguide 505, from a connection portion 504' to an optical connector 504. In this case, the input light signals are multiplexed from the respective sub-waveguides.

Figure 15:
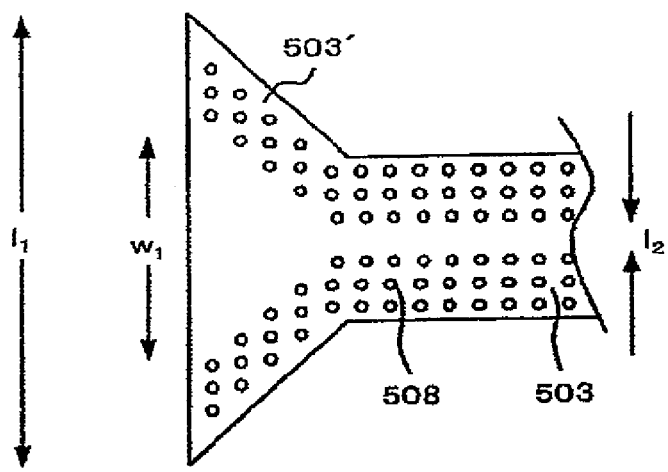
FIG. 15 is a schematic plan view showing the structure of an optical waveguide oscillator part in FIG. 10.

The structure of the connecting portion 503' is as shown in FIG. 15, and the structure of the connection portion 504' is the left-right reversed structure of FIG. 15. Columnar fine protrusions of the connection portion 504' are arranged in the opposite direction of FIG. 15.

FIG. 15 is a schematic layout view of columnar fine protrusions 508 in the optical waveguide 503. The width of an input part of the optical waveguide 503' is set to 20 μm in order to allow for an alignment error between the transmission unit 502 and the optical waveguide 503, and the plane cross section thereof is flared. Then, in a center part of a straight portion, one row of columnar fine protrusions is removed to form an area without a photonic band gap, and thereby the optical signal is led into an area (w1) with 1 μm in width. In addition, the gap (pitch) between the columnar fine protrusions 508 is set to 0.5 μm. FIG. 15 illustrates fewer columnar protrusions 508 than the actual number thereof, for simplicity.

In this embodiment, when forming the columnar fine protrusions 508 in the transmission unit 502 and when forming desired columnar fine protrusions in a desired transmission unit, the same alignment method as that of Embodiment 1 is applied to prepare the optical information processing device.

Here, the magnitude of the equivalent diameter (the diameter or one side) of the fine protrusion can be discretionarily adjusted in the range of 10 nm to 10 μm from a relationship with the wavelength of a light source used for a semiconductor laser or the like. Moreover, the height of the fine protrusion is preferably in the range of 50 nm to 10 μm. The distance (pitch) between the fine protrusions is set to about a half the signal wavelength used.

Because the optical circuit 500 can deliver optical signals of ten different kinds of wavelengths in a superposed condition and can change the traveling direction of light, the width of the optical circuit 500 can be decreased greatly to 5 mm and thus the device used for optical communications can be miniaturized. Moreover, because the columnar fine protrusion 508 can be formed by pressurizing the stamper, the manufacturing cost can be reduced. Although in this embodiment a device for multiplexing input light is described, it is apparent that the optical waveguide 503 is useful for all the optical devices that control light paths.

Embodiment 5

Biodevice

Figure 16:
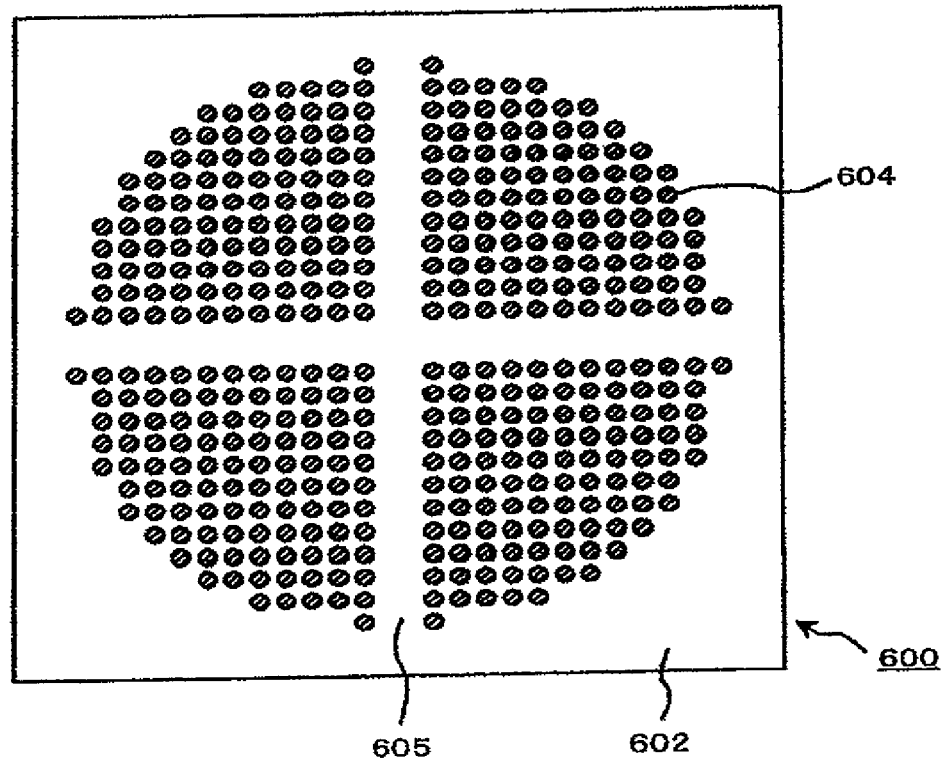
FIG. 16 is a plan view showing the structure of a cell culture sheet according to an embodiment of the present invention.

FIG. 16 is a plan view of a cell culture sheet 600. The cell culture sheet 600 comprises; a thin film (sheet) 602 mainly composed of PMMA with 0.5 μm in thickness; and columnar fine protrusions 604 with an equivalent diameter of 2 μm, the columnar fine protrusion extending from the thin film and being mainly composed of PMMA.

Figure 17:
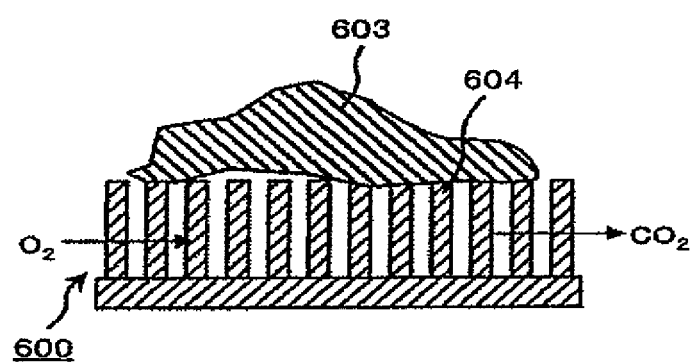
FIG. 17 is a side view of the culture sheet explaining the cell culture in FIG. 12.

A part of the columnar fine protrusions is removed to form a gap 605. This cell culture sheet 600 is put into a vessel, such as a glass plate, and is soaked with a culture solution in the vessel to thereby perform culture. As shown in FIG. 17, for example, a culture solution 603 of cells (organization), such as skin, bone, or blood, and culture medium, or a nutrient, or the like, is placed on the columnar fine protrusions 604 of the cell culture sheet 600, thereby performing culture of cells or the like.

It is preferable to provide and arrange a certain gap 605 in the columnar fine protrusions, the certain gap 605 being obtained by removing a part of the columnar fine protrusions. In this embodiment, as illustrated in FIG. 16, the gap is provided in a cross shape. Formation of such gap facilitates the culture solution to flow, thus allowing the nutrient to be provided to the cells efficiently. Moreover, waste products of cells during the cell culture can be discharged efficiently.

In this embodiment, the alignment method of Embodiment 1 is applied at the time of forming the columnar fine protrusions in an arbitrary pattern formation area on the sheet. After forming the columnar fine protrusions, this sheet is cut into a desired size and shape for use.

The use of this cell culture sheet allows the damage to a sheet-shaped epidermal cell due to the delamination from a plate, the delamination conventionally occurring when using a regular glass plate, to be reduced significantly. Thereby, the plating efficiency when transplanting a sheet-shaped epidermic cell to a skin can be improved. Moreover, through a gap formed under the sheet-shaped epidermal cell, the gap being formed from the columnar fine protrusions on the cell culture sheet, the culture solution will easily flow into the entire sheet-shaped epidermal cells. As a result, the supply of nutrients to the cells and the discharge of waste products of the cell can be carried out efficiently, and thus the extinction of epidermal cells during cell culture that conventionally occurred can be suppressed.

The columnar fine protrusions is 3 μm in height and is formed in an array at a cycle (pitch) of 1 μm. The equivalent diameter in the mid-position in the height direction of the columnar fine protrusion is 300 nm and is 330 nm at the bottom. Moreover, the cross section at the tip of the columnar fine protrusion is smaller than the cross section at the bottom, namely the columnar fine protrusion is flared.

The cell culture sheet formed in this embodiment was put in a glass plate while being soaked with a culture solution, and normal human keratinocyte was cultivated on the cell culture sheet using a conventional method (the used culture medium: HuMedia-KB2 (manufactured by Kurabo Industries, Ltd.), cultivated at 37° C. under a stream of $CO_2$ (5%)). As a result, the keratinocyte that adhered successfully on the cell culture sheet and proliferated in a sheet shape.

On day 14 after culture initiation, a polyvinylidene difluoride (PVDF) film with 2 cm in diameter was put on the cultured cell, and then the medium was absorbed and thereby the sheet-shaped keratinocyte, which proliferates on a nano pillar sheet, is detached from the cell culture sheet together with the PVDF film. This sheet-shaped keratinocyte could be easily detached from the covered PVDF film. The damages to this sheet-shaped keratinocyte due to delamination from the cell culture sheet could be reduced significantly as compared with a case where a regular glass plate or the like is used.

Hydrophilization treatment may be carried out to polymeric material by plasma treatment or the like. Moreover, the polymeric material is not limited in particular, but it is preferable to select a material having small influence on cells (organization) to be cultivated, and for example, polystyrene, PMMA, polylactic acid, and the like are desirable.

Embodiment 6

Multilayer Wiring Substrate

Figure 18A:
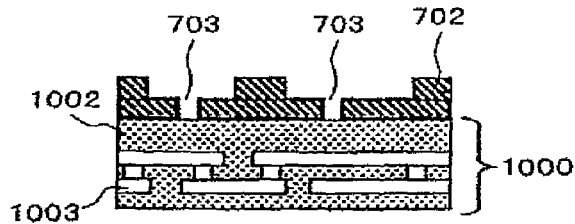
FIGS. 18A-18L are views explaining the steps of forming a multilayer wiring substrate according to an embodiment of the present invention.
Figure 18G:
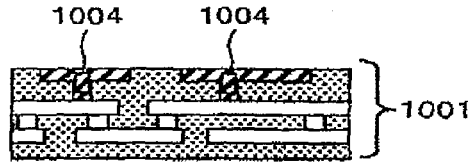
Figure 18B:
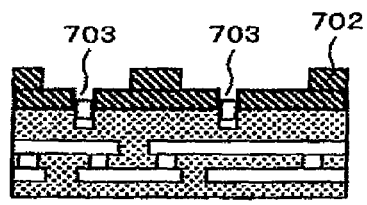
Figure 18H:
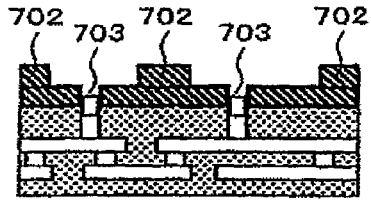
Figure 18C:
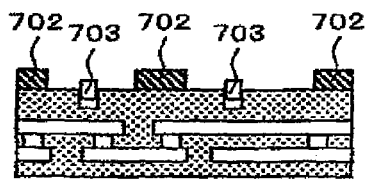
Figure 18I:
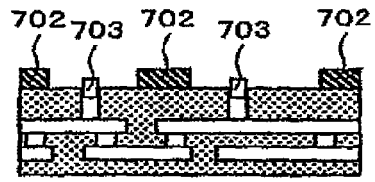
Figure 18D:
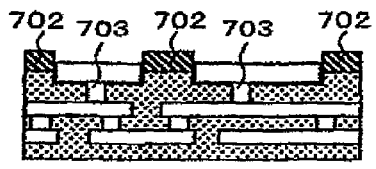
Figure 18J:
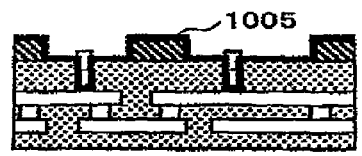
Figure 18E:
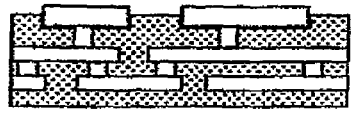
Figure 18K:
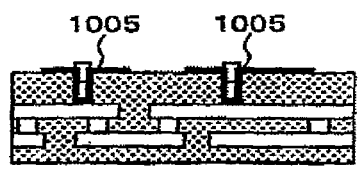
Figure 18F:
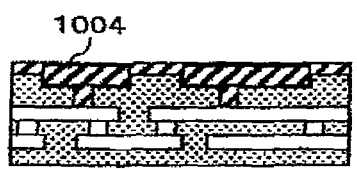
Figure 18L:
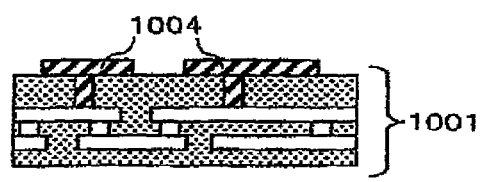

FIGS. 18A-18L are views explaining the steps for preparing a multilayer wiring substrate. First, as shown in FIG. 18A, after forming a resist 702 on the surface of a multilayer wiring substrate 1001 comprised of a silicone oxide film 1002 and copper wirings 1003, pattern transfer by means of a stamper (not illustrated) is carried out. Before carrying out the pattern transfer, a relative alignment between the stamper and the substrate is made with the same approach as Embodiment 1, and a desired wiring pattern is transferred to a desired position in the substrate. Next, if an exposed area 703 of the multilayer wiring substrate 1001 is dry etched using $CF_4/H_2$ gas, the exposed area 703 in the surface of the multilayer wiring substrate 1001 is formed into a groove shape as shown in FIG. 18B. Next, the resist 702 is resist etched by RIE to remove the resist in a portion having a low step, and thereby the exposed area 703 is extendingly formed as shown in FIG. 18C. If in this state the exposed region 703 is dry-etched until the depth of the previously formed groove reaches the copper wiring 1003, then a structure as shown in FIG. 18D is obtained. Then, by removing the resist 702, the multilayer wiring substrate 1001 having groove shapes in the surface thereof as shown in FIG. 18E is obtained. From this state, electrolytic plating is carried out after forming a metal film on the surface of the multilayer wiring substrate 1001 by sputtering (not illustrated), and thereby a metal plating film 1004 is formed as shown in FIG. 18F. Thereafter, if the metal plating film 1004 is polished until the silicone oxide film 1002 of the multilayer wiring substrate 1001 is exposed, the multilayer wiring substrate 1001 having metal wirings on the surface thereof can be obtained as shown in FIG. 18G.

Moreover, other process steps for preparing the multilayer wiring substrate is described. By etching until reaching the copper wiring 1003 in the multilayer wiring substrate 1001 at the time of dry etching the exposed area 703 in the state shown in FIG. 18A, a structure shown in FIG. 18H is obtained. Next, the resist 702 is etched by RIE to remove the resist in a portion having a low step, thereby obtaining a structure shown in FIG. 18I. If in this state a metal film 1005 is formed in the surface of the multilayer wiring substrate 1601 by sputtering, a structure of FIG. 18J is obtained. Next, by removing the resist 702 by lift-off, a structure shown in FIG. 18K is obtained. Next, by carrying out electroless plating using the remaining metal film 1005, the multilayer wiring substrate 1001 with a structure shown in FIG. 18L can be obtained. By applying the present invention to the multilayer wiring substrate, it is possible to form wirings having a tightly restricted dimensional tolerance.

The pattern transfer method and imprint device according to the present invention are extremely advantageous as the manufacturing method and device of high performance devices that require hyperfine structures, such as a recording pit of a large-capacity recording medium, an optical component, a semiconductor integrated circuit pattern, and a biodevice.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An imprint device which presses a stamper having a concavo-convex pattern against a transferred object and which thus transfers the concavo-convex pattern of the stamper to the transferred object, the imprint device comprising:
    a light irradiation mechanism for irradiating at least an edge of the transferred object with light, the light irradiation mechanism being installed in the back direction of either one of the transferred object or the stamper;
    a light detection mechanism for detecting a light that is irradiated from the light irradiation mechanism to an edge of the transferred object, the light detection mechanism being installed in the back direction of the other one of the transferred object or the stamper;
    a position detector that detects an edge position of the transferred object based on a detection result of the light detection mechanism and calculates a position of an arbitrary point on the transferred object from the edge position; and
    a positioning mechanism that adjusts a relative position between the transferred object and the stamper from the position information detected by the position detector,
    wherein the light irradiation mechanism simultaneously irradiates an edge of the transferred object, and an alignment mark formed in the stamper or an edge of the stamper, with light,
    wherein the light detection mechanism detects an intensity of transmitted light at the edge of the transferred object, and at the alignment mark formed in the stamper or at the edge of the stamper, on the basis of the irradiation light from the light irradiation mechanism, and wherein the position detector detects the edge position of the transferred object, and a position of the alignment mark of the stamper or an edge position of the stamper, from a difference in the intensity of transmitted light detected by the light detection mechanism.

2. The imprint device according to claim 1, wherein two or more edge positions of the transferred substrate are detected.

3. The imprint device according to claim 1, wherein at least two pieces of the light detection mechanism are installed and the light detection mechanism detects an edge position at different positions, respectively.

4. The imprint device according to claim 1, wherein a depth of focus of the light detection mechanism is greater than a thickness of the transferred object.

5. The imprint device according to claim 1, wherein the light detection mechanism detects an intensity of transmitted light of a light irradiated from the light irradiation mechanism.

6. The imprint device according to claim 1, wherein a hole is formed in a center portion of the transferred object, and the position of a central-hole edge of the transferred object is detected by the position detector.

* * * * *